United States Patent [19]
Palmer

[11] 3,757,910
[45] Sept. 11, 1973

[54] SHOCK ABSORBER AND COMPRESSION VALVE ASSEMBLY

[75] Inventor: Dale A. Palmer, Monroe, Mich.

[73] Assignee: Monroe Auto Equipment Co., Monroe, Mich.

[22] Filed: July 29, 1971

[21] Appl. No.: 167,135

Related U.S. Application Data

[63] Continuation-in-part of Ser. No. 867,427, Sept. 17, 1968.

[52] U.S. Cl. .............................. 188/322, 137/493.9
[51] Int. Cl. .................................................. F16f 9/34
[58] Field of Search.................... 188/282, 317, 320, 188/322; 137/493, 493.9

[56] References Cited
UNITED STATES PATENTS

| | | | |
|---|---|---|---|
| 3,194,262 | 7/1965 | Hamilton et al. ................... | 137/493 |
| 2,849,090 | 8/1958 | De Koning et al. ............... | 137/493.8 |

FOREIGN PATENTS OR APPLICATIONS

| | | | |
|---|---|---|---|
| 1,058,601 | 11/1953 | France ................................. | 188/320 |

Primary Examiner—George E. A. Halvosa
Attorney—J. King Harness, H. Keith Miller et al.

[57] ABSTRACT

In combination in a shock absorber, a pressure cylinder, a piston movable within the cylinder, valve means on the piston for controlling the flow of fluid through the piston between the opposite sides thereof, a fluid reservoir adjacent the cylinder, and a compression valve assembly for communicating fluid between the reservoir and the cylinder, the compression valve assembly comprising a first member defining a first flow passage and a first valve seat, a second member defining a second flow passage and a second valve seat, and at least one generally ring-shaped valve element interposed between the first and second members and adapted for free longitudinal sliding movement toward and away from engagement with the first and second valve seats.

6 Claims, 10 Drawing Figures

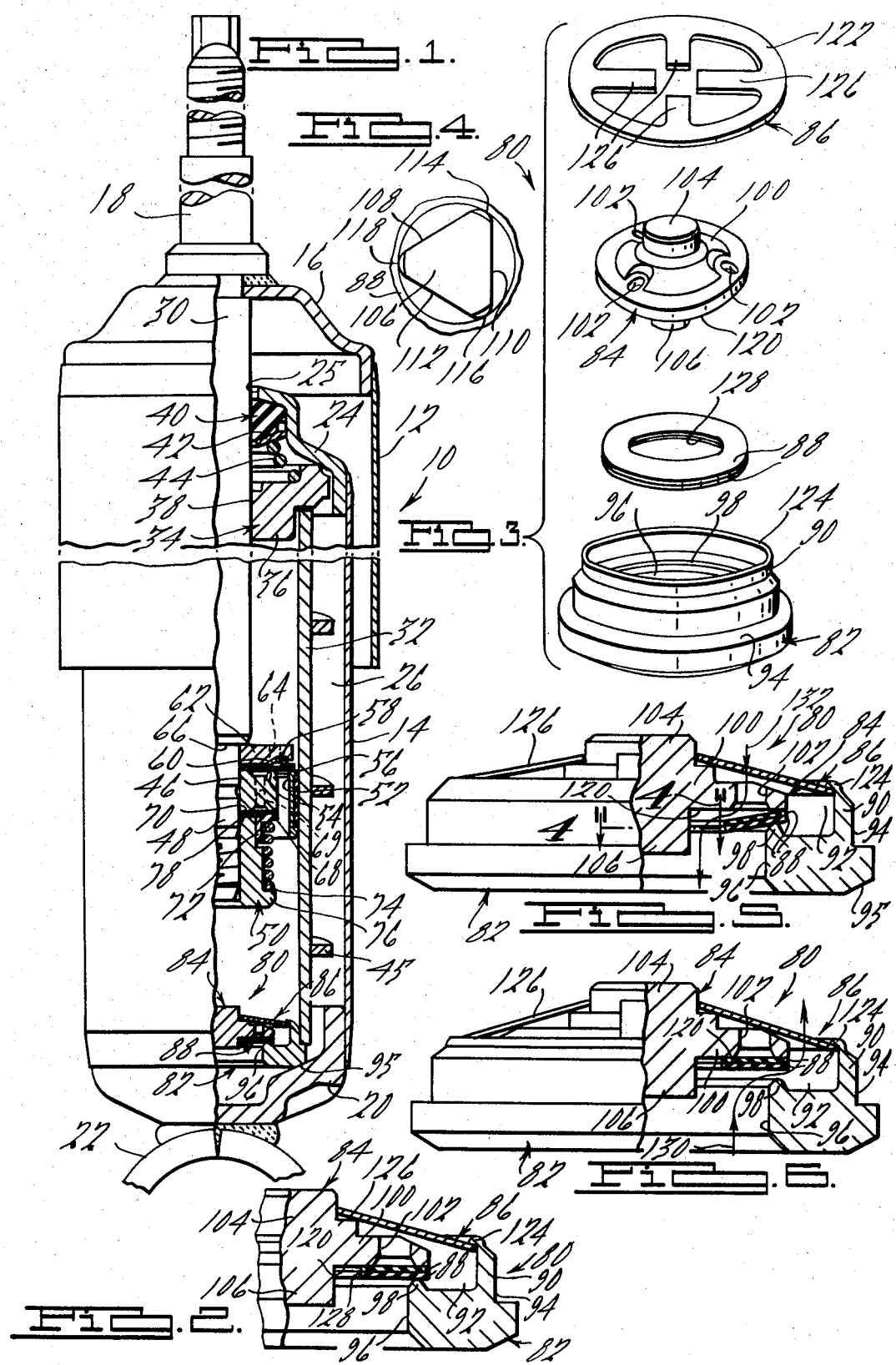

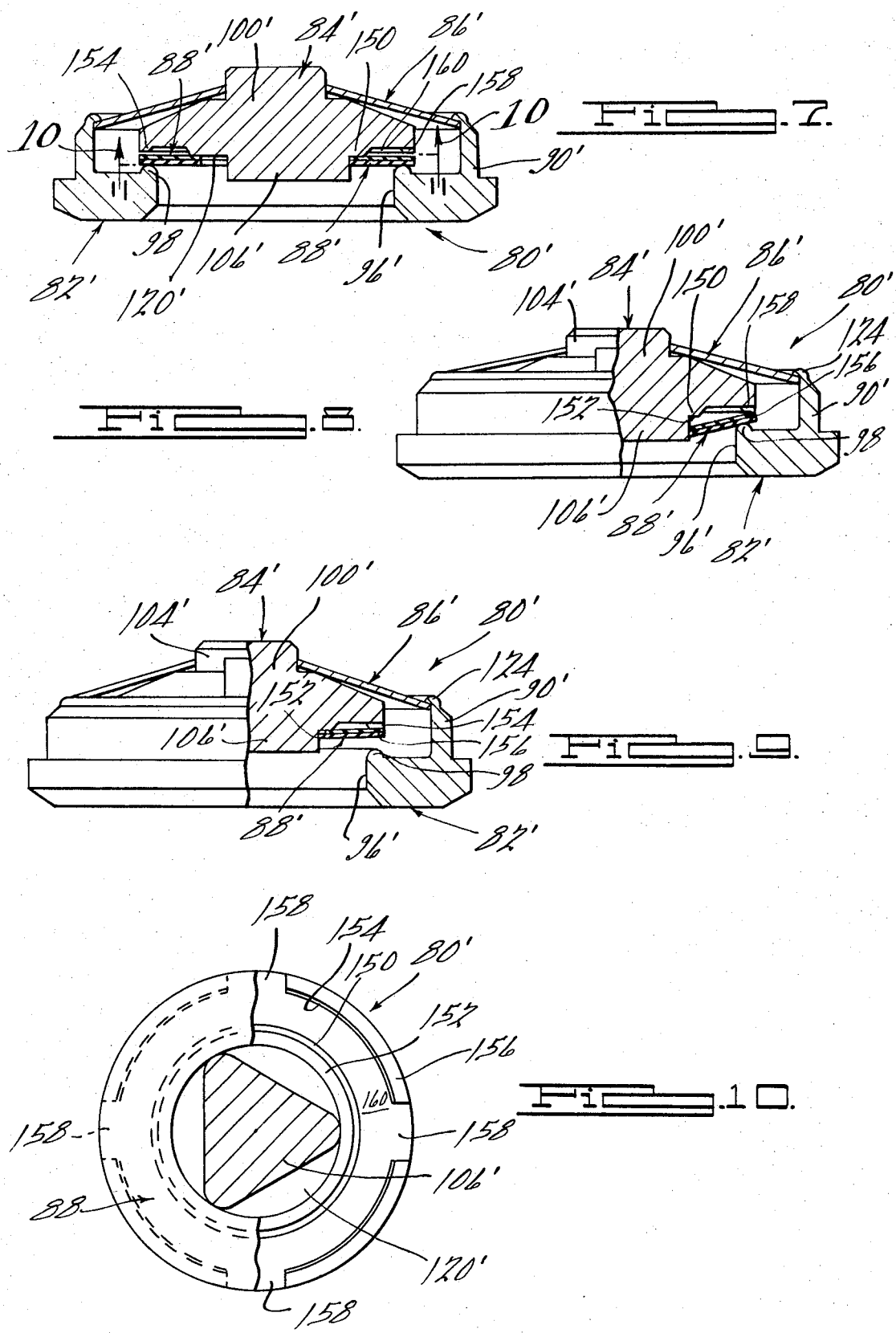

SHOCK ABSORBER AND COMPRESSION VALVE ASSEMBLY

RELATED APPLICATIONS

This is a continuation-in-part application of U.S. application, Ser. No. 867,427, filed Sept. 17, 1969, now abandoned.

SUMMARY OF THE INVENTION

The present invention relates generally to hydraulic shock absorbers and more specifically to a new and improved compression valve assembly which functions to selectively communicate hydraulic fluid between a fluid reservoir and a pressure cylinder within which the shock absorber piston and piston rod are reciprocally disposed. The new and improved compression valve assembly of the present invention is of an extremely simple and compact design and features a valve arrangement which permits interchanging of valve elements to control the compression characteristics of the assembly, thereby providing for universality of application. The valve arrangement is designed such that one or more valve elements are utilized for controlling the compression characteristics of a standard shock absorber unit, and wherein the total number and/or thickness of the valve elements may be varied, i.e., increased or decreased, to change the compression characteristics of the shock absorber. Another feature of the compression valve assembly of the present invention resides in the fact that the aforesaid valve elements are free to move toward and away from associated valve seats, thereby obviating the need for any clamping means or the like heretofore commonly used in similar type valve assemblies. This, of course, reduces the number of component parts of the assembly and the attendant manufacturing costs thereof.

It is accordingly a general object of the present invention to provide a new and improved compression valve assembly for hydraulic shock absorbers and the like.

It is a more particular object of the present invention to provide a new and improved compression valve assembly of the above character whose compression characteristics may be easily changed.

It is another object of the present invention to provide a new and improved compression valve assembly which utilizes one or more generally ring-shaped valve elements, the total number of which elements and/or thicknesses thereof being variable to control the compression characteristics of the assembly.

It is a further object of the present invention to provide a compression valve assembly of the above described type which obviates the need for any clamping or other fixedly mounting means for the valve elements.

It is yet another object of the present invention to provide a compression valve assembly of the above described type which utilizes a valve plate having a generally axially extending guide portion upon which the valve elements are slidably mounted and guided for movement toward and away from associated valve seats.

It is still another object of the present invention to provide a new and improved compression valve assembly which is of an extremely simple design, is easy to assemble and economical to commercially manufacture.

Other objects and advantages of the present invention will become apparent from the following detailed description taken in conjunction with the accompanying drawing.

BRIEF DESCRIPTION OF THE DRAWINGS

FIG. 1 is a longitudinal side elevational view, partially broken away, of a shock absorber embodying the principles of the present invention;

FIG. 2 is an enlarged fragmentary cross sectional view of a portion of the compression valve assembly incorporated in the shock absorber shown in FIG. 1;

FIG. 3 is an exploded assembly view of the compression valve assembly shown in FIG. 2;

FIG. 4 is a fragmentary cross sectional view taken substantially along the line 4—4 of FIG. 5;

FIG. 5 is an enlarged side elevational view, partially broken away, of the compression valve assembly shown in FIG. 2, as seen during a compression phase of the associated shock absorber unit;

FIG. 6 is a view similar to FIG. 5 showing the compression valve assembly during the rebound phase of the associated shock absorber unit;

FIG. 7 is a transverse cross sectional view of a compression valve assembly in accordance with an alternate embodiment of the present invention;

FIG. 8 is a view of the modified valve assembly similar to FIG. 7 and illustrates the valve member therein in a partially closed configuration;

FIG. 9 is a view similar to FIGS. 7 and 8 and illustrates the valve member of the valve assembly in a substantially open configuration; and FIG. 10 is a transverse cross sectional view taken substantially along the line 10—10 of FIG. 7.

DETAILED DESCRIPTION OF THE INVENTION

Referring now in detail to the drawing and in particular to FIG. 1, a shock absorber assembly 10, in accordance with a preferred embodiment of the present invention, is shown as comprising upper and lower, generally tubular-shaped, concentrically and telescopically oriented members 12 and 14. As is conventional, the members 12, 14 are longitudinally movable relative to one another and are adapted for operative attachment to the sprung and unsprung portions of an associated vehicle or the like. The upper end of the member 12 is provided with a generally cup-shaped end cap member 16 which is fixedly secured to the member 12 and is provided with an upwardly extending, externally threaded stud-like mounting member 18 adapted to be secured by any suitable means to one of the associated vehicle portions. The lower end of the member 14 is provided with a similar type, generally cup-shaped end cap member 20 which is fixedly secured to the member 14 and is provided with a ring-like attaching element 22. The opposite (upper) end of the member 14 is provided with an end cap member 24 which is formed with a central aperture 25 and with the member 14 defines a fluid reservoir 26. A longitudinally disposed piston rod 30 extends axially of the assembly 10 and has the upper end thereof projecting through the aperture 25.

Disposed concentrically within the reservoir 26 is a longitudinally extending pressure cylinder 32, the upper end of which is provided with a piston rod guide member 34 having a downwardly extending, reduced diameter portion 36 adapted to be received within the upper end of the cylinder 32. The guide member 34 defines a central annular bore 38 through which the piston rod 30 extends. A rubber or other suitable sealing element 40 surrounds the piston rod 30 and is confined within the interior of the cap member 24 by a suitable retainer member 42 and helical coil spring 44. A helical baffle 45 is disposed within the reservoir 26 interjacent the outer periphery of the cylinder 32 and the inner periphery of the member 14 and serves to reduce the turbulence of hydraulic fluid or the like as the same moves into and out of the reservoir 26, as is well known in the art.

A piston member, generally designated 46, is mounted on a lower, reduced diameter end portion 48 of the piston rod 30 and is adapted to be secured thereon by a suitable threadably mounted retaining nut 50. The piston member 46 is provided with a plurality of circumferentially spaced radially outermost disposed set of longitudinally extending apertures 52 which are located between a pair of radially spaced, concentric valve seats 54 and 56 provided on the upper end of the member 46. The valve seats 54, 56 are cooperable with and adapted to be engaged by a relatively thin, washer-like valve 58 which functions to close the apertures 52 when the piston rod 30 is moved upwardly within the pressure cylinder 32. A spring disk 60 is disposed directly above the valve 58 and is adapted to resiliently urge the latter toward the valve seat 54, 56. A retaining member 62 having a plurality of apertures 64 therein is disposed directly above the spring disk 60 and bears against a radially extending shoulder 66 formed adjacent the end of the piston rod portion 48. An annular valve seat 68 is provided on the lower side of the piston member 46 at a position radially outwardly of a plurality of circumferentially spaced, longitudinally extending inner set of apertures 69 and is adapted to be engaged by a thin washer-like valve 70 which is urged against the valve seat 68 by means of an annular sleeve member 72 which is slidable downwardly along the nut 50 and is adapted to be resiliently urged upwardly by a helical coil spring 74, the lower end of which bears against a radially outwardly extending flange portion 76 formed on the lower end of the nut 50. A washer-like member 78 is disposed between the upper end of the nut 50 and the valve 70, the washer 78 as well as the valve 70, sleeve 72 and spring 74 being maintained in its respective operative position upon suitable tightening of the nut 50. It will be seen that when the piston 46 is moved upwardly, fluid under pressure will move downwardly through the apertures 69, thereby unseating the valve 70 and permitting fluid to pass into the area below the piston 46, as will be described more fully in connection with the description of the overall operation of the shock absorber 10 of the present invention.

In accordance with the principles of the present invention, the shock absorber 10 is provided with a new and improved compression valve assembly, generally designated by the numeral 80, which comprises a cylinder end member 82, a valve plate 84, a spring disk 86 and one or more washer-like valve members, generally designated 88. The cylinder end member 82 is formed with a vertically upwardly extending annular side wall portion 90 which defines on the radially inner side therein a central annular cavity 92. An annular recess 94 is formed around the outer periphery of the member 82 and is adapted to receive and be fixedly secured to the lower end of the pressure cylinder 32. As best illustrated in FIG. 1, the radially outermost lower edge of the member 82 is chamfered or tapered, as seen at 95, and is adapted to be supported upon the upper side of the end cap member 20. The cylinder end member 82 is formed with a central annular opening or aperture 96, the upper end of which terminates adjacent an annular valve seat, generally designated 98, upon which the lower side of the lowermost of the valve members 88 is adapted to seat or engage, as will be described.

The valve plate 84 comprises a generally laterally extending body section 100 within which a plurality (preferably three) of circumferentially spaced apertures 102 are formed. Extending axially upwardly from the center of the body section 100 is a generally cylindrically shaped portion 104 which is formed integrally of the section 100 and located equidistant from the apertures 102. Integrally formed on the lower side of the body section 100 of the valve plate 84 and extending downwardly therefrom is a generally triangular-shaped portion 106 which is defined by three substantially equal length sides 108, 110 and 112, which, as best illustrated in FIG. 4, terminate at apex portions 114, 116 and 118 that are spaced laterally inwardly from the inner periphery of the central aperture 96, as best seen in FIGS. 5 and 6. The lower side of the body section 100 defines a relatively flat, radially extending surface 120 against which the upper surface of the uppermost of the valve members 88 is adapted to engage in order to effect a fluid-tight seal at the lower ends of the plurality of apertures 102, as will be described.

The spring disk 86 generally comprises a ring-shaped or annular support section 122, the outer edge of which is substantially the same diameter of the inner diameter of the wall 90 of the end member 82, whereby the disk 86 may be nestingly received within the upper end of the cavity 92 as illustrated. The support section 122 is adapted to be secured to the upper end of the wall 90 by having a reduced thickness portion 124 formed at the upper end of the wall 90 crimped or otherwise deformed radially inwardly over the upper surface of the disk portion 122, as illustrated. Extending radially inwardly from and integrally connected to the ring-shaped portion 122 is a plurality of circumferentially spaced, radially extending spring fingers, generally designated 126. The fingers 126, as illustrated in FIG. 3, terminate radially outwardly from the center of the member 86 and are adapted to abuttingly engage the outer periphery of the cylindrical portion 104 of the valve plate 84 and thereby operatively support the valve plate 84 for limited vertical or longitudinal movement with respect to the cylinder end member 82, such limited relative movement of the valve plate 84 with respect to the member 82 being shown by the respective positions of the valve plate 84 in FIGS. 5 and 6.

Each of the valve members 88 is of a generally flat ring-shaped configuration and defines a central annular bore or opening 128, with the diameter of the openings 128 of the valve members 88 being selected such that said members 88 may move relatively free longitudinally of the triangular-shaped portion 106 of the valve plate 84, yet permit the apex portions 114–118 to prevent any excessive relative lateral or radial movement of the valve members 88 with respect to the valve plate 84. That is, the valve plate portion 106 functions to guide the valve members 88 for relatively free longitudinal movement with respect thereto so as to assure that the members 88 are free to move toward and away from sealing engagement with respect to the surface 120 at the lower ends of the apertures 102.

In operation, the shock absorber assembly 10 is adapted to function, generally, in the usual manner, with upward movement of the piston 46 directing fluid through the apertures 69, past the valve 70 and into the lower portion of the pressure cylinder 32. Upon downward movement of the piston rod 30, the fluid in the lower portion of the pressure cylinder 32 will pass upwardly through the plurality of apertures 52 and past the valve 58 into the upper portion of the cylinder 32. The plurality of valve members 88, together with the valve plate 84 and spring disk 86 normally assume the position shown in FIGS. 1 and 2, wherein the upper surface of the uppermost of the valve members 88 bears against the surface 120 of the valve plate 84 and the lower surface of the lowermost of the valve members 88 engages the valve seat 98, thereby blocking fluid flow between the interior of the pressure cylinder 32 and the fluid reservoir 26. When additional fluid is required to fill the area below the piston 46, because of the differential in the volume of the cylinder 32 above and below the piston 46, the entire assemblage consisting of the valve plate 84 and plurality of valve members 88 will move from the position shown in FIG. 2 to the position shown in FIG. 6, wherein fluid may flow from the reservoir 26 upwardly through the aperture 96, between the lower surface of the lowermost valve member 88 and the valve seat 98, then through the interior of the cavity 92, and finally into the interior of the lower end of the pressure cylinder 32, as indicated by the arrow 130 in FIG. 6. It will be noted that as the valve plate 84 moves upwardly through the action of the spring fingers 126 of the spring disk 86, the plurality of valve members 88 remain positively engaged with the valve plate 84, that is, the upper surface of the uppermost valve member 88 remains contiguously engaged with the surface 120 so as to block fluid flow through the apertures 102.

Due to the presence of the piston rod 30 within the upper portion of the pressure cylinder 32, pressure will build up within the lower portion of the cylinder 32 as the piston 46 moves downwardly. When this occurs, the plurality of valve members 88 will be biased from the position shown in FIG. 2 to the position shown in FIG. 5, wherein the radially innermost portions of the valve members 88 will be biased downwardly or away from engagement with the surface 120 so that fluid within the lowermost part of the pressure cylinder 32 may pass downwardly through the plurality of apertures 102, between the surface 120 and the upper surface of the uppermost valve members 88, through the central aperture 96 and back to the fluid reservoir 26, as indicated by the arrow 132 in FIG. 5.

An important feature of the shock absorber 10 of the present invention, and in particular in the new and improved compression valve assembly 80 incorporated therein, resides in the fact that the plurality of valve members 88 are not fixed or clamped in any way within the assembly 80, but instead, are free to move longitudinally of the valve plate portion 106 and be effectively guided in place by the apex portions 114–118 thereof. This arrangement substantially reduces the number of component parts of the valve assembly 80 to only four thereby reducing manufacturing costs, as well as minimizing to the extreme, assembly time and effort required in the production of the valve assembly 80. Another feature of the present invention resides in the fact that the compression characteristics of the shock absorber 10 may be controlled or determined by the thickness and/or number of the valve members 88, with the result that the compression characteristics may be changed merely through the addition or substraction of one or more of the valve members 88, and/or by varying the effective thickness thereof. This will be seen to provide a number of advantages from an inventory standpoint and greatly enhance the economies of production due to the fact that a single valve assembly 80 may be produced which may be associated with shock absorbers of different compression characteristics, with a single valve assembly 80 being universally applicable for each of the shock absorbers merely through the simple interchanging of valve members 88.

Referring now to FIGS. 7 through 10, a slightly modified embodiment of the compression valve assembly of the present invention is generally designated by the numeral 80' and is shown as comprising an annular base member 82', a plurality of valve disks or members 88', a spring disk 86' and a valve plate 84', all of which components are identical in construction and operation to the analogous components of the valve assembly 80 designated by like numerals, with the exception of the valve plate 84' which differs from the aforedescribed in the valve plate 84 in the below described manner. For purposes of conciseness of description, the corresponding components and component parts of the compression valve assembly 80' illustrated in FIGS. 7 through 10 which are analogous to identical components or component parts of the above described valve assembly 80, will be designated by like numerals with a prime (') suffix.

As best illustrated in FIG. 7, the valve plate 84' comprises a central body section 100' having a centrally located upwardly extending section 104' and a generally triangular shaped downwardly extending section 106'. The underside of the body section 100' comprises a generally radially outwardly extending surface 120', the inner periphery of which is formed with an axially downwardly displaced shoulder portion 150 that defines a flat generally radially extending lower surface 152 providing a valve seat extending around the outer periphery of the valve plate portion 106'. The outer periphery of the surface 120' is formed with a second downwardly extending shoulder portion 154 which extends around the periphery of the valve plate 84' and defines a generally flat, radially extending surface 156. As illustrated, the surface 156 lies in a plane extending transversely of the axis of the valve assembly 80' that is spaced axially above the plane in which the surface 152 resides. In a preferred construction of the present invention, the surface 156 is in the order of nine one-thousandths (0.009) above the surface 152, for purposes hereinafter to be described.

As best illustrated in FIG. 10, the shoulder 154 projecting downwardly around the periphery of the valve plate 84' is formed with a plurality of radially inwardly extending, circumferentially spaced recesses or notches, generally designated by the numeral 158, which function to communicate the lower end of the associated pressure cylinder with an annular chamber 160 that is defined by the shoulder portions 150, 154 and surface 120'. Preferably the notches 158 extend upwardly through the entire thickness of the shoulder 154 so that the upper marginal portions thereof are generally coplanar of the surface 120'.

As best seen in FIG. 7, the spring fingers 126' of the spring disk 86' are adapted to exert a slight downwardly directed force upon the valve plate 84' and thereby effect a preloading of the valve assembly 80', with the result that the members 88' assume a generally frusto-conical configuration which, together with the axial spacing between the surfaces 152, 156, results in the upper side of the uppermost of the valve members 88' being normally spaced somewhat below the surface 156 of the shoulder 154, as illustrated.

The operation of the modified compression valve assembly 80' of the present invention is substantially identical to the operation of the aforedescribed assembly 80, with the exception that the fluid flow between the interior of the associated pressure cylinder and fluid reservoir occurs, in part, through the plurality of notches 158 as opposed to the apertures 102. More particularly, upon downward movement of the associated piston and piston rod, fluid in the lower end of the pressure cylinder will pass through the plurality of notches 158 and to the chamber 160. By virtue of the fact that the inner peripheral portion of the uppermost of the valve members 88' is engaged with the surface 152, fluid flow is prevented between the chamber 160 and the associated fluid reservoir. At such time as the fluid pressure within the lower end of the pressure cylinder increases to a preselected level due to downward movement of the associated piston and piston rod, the valve members 88' will be biased from the position shown in FIG. 7 to the position shown in FIG. 8, wherein the radially innermost portions of the valve members 88' are biased downwardly or away from the surface 152 so that fluid may pass downwardly through the central aperture 96' and into the associated fluid reservoir. When additional fluid is required to fill the volume within the pressure cylinder, the entire assemblage consisting of the valve plate 84' and plurality of valve members 88' will move from the normal position shown in FIG. 7 (or from the position shown in FIG. 8), to the position shown in FIG. 9, wherein fluid may flow from the reservoir upwardly through the aperture 96', between the lower surface of the lowermost valve member 88' and the valve seat 98', and finally into the pressure cylinder.

A particular feature of the above described construction resides in the fact that the restriction to fluid flow through the plurality of notches 158 may be varied or controlled without altering the effective area of the fluid which acts against the upper side of the uppermost valve member 88' to bias the members 88' from the position shown in FIG. 7 to that shown in FIG. 8. This is important since it is highly desirable to carefully control the restriction provided by the notches 158, i.e., by changing the number or size of the notches, in order to carefully control the operational characteristics of the assembly; however, it is important that the area of the uppermost valve member 88 against which the fluid acts to effect opening of the members 88' not be changed appreciably upon varying the restriction to fluid flow.

While it will be apparent that the preferred embodiments illustrated herein are well calculated to fulfill the objects above stated, it will be appreciated that the present invention is susceptible to modification, variation and change without departing from the scope of the invention.

I claim:

1. In combination in a shock absorber,
a pressure cylinder,
a piston movable within said cylinder,
valve means on said piston for controlling the flow of fluid through said piston between the opposite sides thereof,
a reservior,
a compression valve assembly for communicating fluid betwen said reservoir and said cylinder,
said compression valve assembly comprising an annular base member disposed at the lower end of said pressure cylinder and defining a centrally located flow passage and an upwardly projecting circular valve seat circumjacent said passage, an annular valve plate arranged coaxially of said base member and having a central section extending downwardly toward said passage and a radially outwardly projecting section disposed above said valve seat being formed with a pair of radially spaced, concentrically oriented shoulder portions defining an annular chamber therebetween,
a plurality of radially extending, circumferentially spaced recesses formed in the radially outermost of said shoulder portions providing flow paths communicating the lower end of said cylinder with said chamber, and
at least one generally flat, ring-shaped valve element interposed between the upper side of said base member and the lower side of said radially outwardly projecting section of said valve plate,
the lowermost portion of the radially innermost of said shoulders lying in a first radial plane and the lowermost portion of the radially outermost of said shoulders lying in a second radial plane spaced slightly above said first radial plane, whereby the upper side of said valve element is normally engaged with said radially innermost shoulder and is spaced below said radially outermost shoulder, with the lower side of said valve element normally being engaged with said valve seat, whereupon a predetermined increase in fluid pressure within the lower end of said cylinder results in said valve plate moving downwardly to a position wherein said lowermost portion of said outermost shoulder is engaged with the upper side of said valve element to slightly deform and effect a prestressing of said valve element, with a further increase in fluid pressure in said cylinder resulting in the inner peripheral portion of said valve element being biased downwardly away from engagement with said innermost shoulder to permit fluid to flow from said chamber through said flow passage into said reservoir, and
upon upward movement of said piston within said cylinder, said valve plate and valve element will move upwardly relative to said base member, resulting in the lower side of said valve element being disengaged from said valve seat to permit fluid to flow from said reservoir through said flow passage and around the outer periphery of said valve element and said valve plate into said cylinder.

2. The invention as set forth in claim 1 which includes spring means in the form of a plurality of circumferentially spaced spring fingers secured at their outer ends to said base member and exerting a resilient downwardly directed force against said valve plate.

3. The invention as set forth in claim 1 wherein said second plane is spaced above said first plane between 0.008 and 0.010 inches.

4. The invention as set forth in claim 1 wherein said first plane is spaced below said second plane approximately 0.009 inches.

5. The invention as set forth in claim 1 wherein said valve plate includes generally axially downwardly extending guide portion means for centrally orienting said valve element.

6. The invention as set forth in claim 5 wherein said guide portion is of a generally polygonal configuration and which includes at least two overlying valve elements carried on said guide portion.

* * * * *